May 27, 1930.  W. H. WAMBSGANS  1,760,800
JOINT FOR ARTIFICIAL LIMBS
Filed Oct. 24, 1928
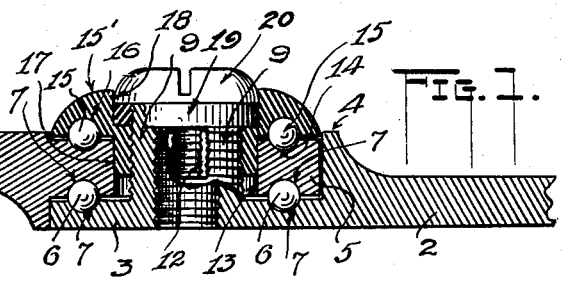
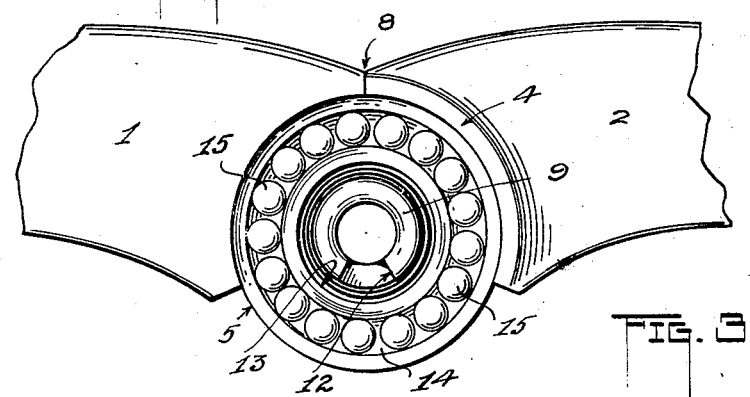
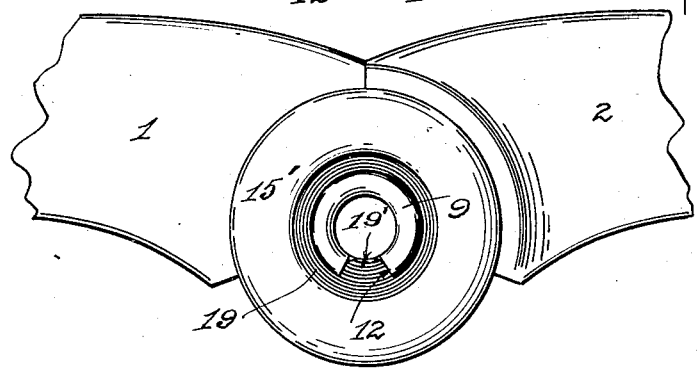
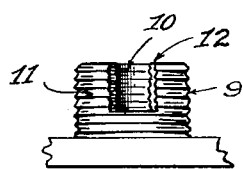
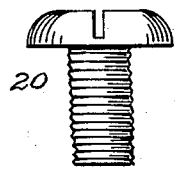

Patented May 27, 1930

1,760,800

UNITED STATES PATENT OFFICE

WILLIAM H. WAMBSGANS, OF PEORIA, ILLINOIS

JOINT FOR ARTIFICIAL LIMBS

Application filed October 24, 1928. Serial No. 314,815.

This invention relates to joints for artificial limbs, being directed particularly to the knee joint or that connecting the upper and lower members of a limb.

My invention lies in providing an exceedingly staunch and reliable joint whose parts can be readily adjusted to just the right degree for taking up any looseness that may develop after extended use, and that is so constructed that there can be no possibility of the adjusted parts changing their positions relatively even under the most severe use.

To the end that my invention may be fully understood the accompanying drawing is provided wherein—

Figure 1 is a longitudinal sectional elevation of my invention greatly enlarged.

Figure 2 is a plan of the joint with certain parts removed to show construction.

Figure 3 is also a plan of the joint not quite completely assembled.

Figure 4 is an elevation of a portion of the joint shown in Figure 1, and

Figure 5 is an elevation of a screw shown in Figure 1.

The reference numerals 1 and 2 designate the two strap-members common to joints of this nature secured in a customary way to the separate members of the artificial limb, not shown.

The member 2 includes a flat circularly curved portion 3 lying at one side of that member, there being a wall 4 extending above it. The member 1 has a correspondingly circularly curved extension 5 to overhang the portion 3 being spaced therefrom by a series of balls 6 lying in ball-grooves 7 in each of the named parts. Both the members 1 and 2 are provided with abutting portions at 8 to limit their movements relatively in one direction as in some joints of this class.

Integral with the portion 3 is a central upstanding hollow stud 9 which is threaded both internally and externally as 10 and 11 respectively, Figure 4, the wall of said stud being cut away to form a recess 12 for a purpose to appear. This stud extends well above the assembled members 1 and 2, as in Figure 1, the purpose of which will be made known. The said member 1 has a central bore 13 to permit the stud to pass through, the diameter of the bore being considerably larger than said stud. A ball-groove 14 is created in the member 1 to receive balls 15 and overlying the latter is a cap 15' having a ball-groove 16, said cap having a tubular extension 17 interiorly threaded to engage the outer threads of said stud 9, said extension lying being the latter and the mentioned wall of the bore 13 of the member 1. The said cap 15' is counterbored at its outer side to create the recess 18 larger than the said stud 9. Lying in the recess is a ring 19 having an extension 19' which engages in the recess 12 of the stud as shown in Figure 3. A screw 20 engages the inner threads of the stud and its head bears upon the said ring 19 holding it in place preventing the extension 19' from leaving the said recess 12, it being understood that an equivalent arrangement may be employed to prevent rotary movement of the ring with respect to the said stud.

The screw 20 besides keeping the ring in engagement with the stud 9 holds said ring upon the cap 15' and by frictional engagement prevents the latter from turning with respect to the member 2 of which, in effect, it is a part. That is to say, since having threaded engagement with the said stem 9 the said cap 15' in being fixed with respect to that member by the screw and ring, it and the member 2 are fixed relatively and turn as a unit on the member 1.

In order to adjust the device it is only necessary to loosen the screw sufficiently to remove friction upon the ring 20 whereupon the cap 15' can be turned in the proper direction to obtain the desired result, the screw being then firmly seated. Preferably the surface of the cap may be knurled, though not so shown, in order to provide a grasping surface, or there may be other provision so that ready adjustment is possible.

While a preferred construction is described and shown minor changes may be made without departing from the spirit of the invention or the scope of the claims to follow.

The extension 17 of the cap 15' is preferably extended well into the opening or bore 13 of the member 1 in order to provide a considerable length of engagement with the stem 9 to the end that said cap will be unable to rock upon the latter, its face having the groove 16 being kept parallel to the face of the member 1.

Users of joints demand that a joint must be as thin as possible and for that reason the extension 17 of said cap is let down into the bore 13 of the member 1 providing for compactness, this in addition to the advantage regarding said extension described above.

I claim:

1. A joint for artificial limbs including in its construction two members each for attachment to a part of a limb, a hollow stem extending from and being integral with one of said members and provided with screw threads on both its inner and outer surfaces, the other member having a bore through it of greater diameter than the said stem, and receiving the latter, a cap having a threaded bore engaging the threads of the stem and extending into the bore of the last named member, said cap being counterbored, a ring seated in the counterbore encircling the stem, the latter and the ring having provision for preventing one turning with respect to the other, and a screw engaging the threaded inner surface of the stem, its head bearing upon the ring and clamping it and the cap in fixed relation.

2. A joint for artificial limbs comprising two members each for attachment to a part of a limb, a hollow internally and externally threaded stem integral with and extending from one of the members and the other member having a bore through which said stem projects, anti-friction elements disposed between the members, a cap engaging the outer threads of the stem, anti-friction elements disposed between the cap and the member having the bore, a ring encircling the stem, said ring and the stem having provision for preventing rotary movement of the two relatively, and a screw engaging the inner threads of the stem, its head bearing upon the said ring.

3. A joint for artificial limbs including in its construction two members, one having a flattened extremity provided with a bore, the other having a flattened extremity and having an integral hollow stem extending from one side thereof through said bore and said stem being both internally and externally threaded, a series of balls lying between the two flattened extremities, a cap including a threaded extension engaging the outer threads of the stem and extending into the named bore, a series of balls lying between the cap and the member having the bore, and said cap having a counter-bore, a ring seated in the counter-bore encircling the stem, said stem having a recess, and said ring having an extension to engage in the said recess, and a screw engaging the internal threads of the stem, its head bearing upon the ring clamping it upon the said cap.

In testimony whereof I affix my signature.

WILLIAM H. WAMBSGANS.